US007073475B2

(12) United States Patent
Wada

(10) Patent No.: US 7,073,475 B2
(45) Date of Patent: Jul. 11, 2006

(54) FLUID SUPPLY MECHANISM FOR POWER GENERATOR

(75) Inventor: Masami Wada, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 65 days.

(21) Appl. No.: 10/397,094

(22) Filed: Mar. 25, 2003

(65) Prior Publication Data

US 2003/0183180 A1 Oct. 2, 2003

(30) Foreign Application Priority Data

Mar. 27, 2002 (JP) ............................ 2002-088279

(51) Int. Cl.
*H02K 5/00* (2006.01)

(52) U.S. Cl. ................................................ 123/195 A

(58) Field of Classification Search .................... 123/2, 123/195 A, 198 E
See application file for complete search history.

(56) References Cited

U.S. PATENT DOCUMENTS

| | | | | |
|---|---|---|---|---|
| 4,350,123 | A * | 9/1982 | Kossek et al. | 123/2 |
| 4,622,923 | A * | 11/1986 | Nishimura et al. | 123/2 |
| 4,702,201 | A * | 10/1987 | Odo et al. | 123/2 |
| 4,721,070 | A * | 1/1988 | Tanaka et al. | 123/2 |
| 4,729,353 | A * | 3/1988 | Streng | 123/195 A |
| 5,642,702 | A * | 7/1997 | Kouchi et al. | 123/198 E |
| 5,899,174 | A * | 5/1999 | Anderson et al. | 123/2 |
| 6,039,009 | A * | 3/2000 | Hirose | 123/2 |
| 6,095,099 | A * | 8/2000 | Morohoshi et al. | 123/2 |
| 6,313,543 | B1 * | 11/2001 | Frank | 290/1 A |
| 6,431,126 | B1 * | 8/2002 | Saito | 123/2 |
| 6,489,690 | B1 * | 12/2002 | Hatsugai et al. | 290/1 A |

FOREIGN PATENT DOCUMENTS

| | | |
|---|---|---|
| JP | 11-200861 | 7/1999 |
| JP | 11-200873 | 7/1999 |
| JP | 11-200875 | 7/1999 |
| JP | 11-200876 | 7/1999 |
| JP | 11-200877 | 7/1999 |
| JP | 11-700874 | 7/1999 |
| JP | 2001-27125 | 1/2001 |
| JP | 2001-27126 | 1/2001 |
| JP | 2001-27127 | 1/2001 |
| JP | 2001-27128 | 1/2001 |

* cited by examiner

*Primary Examiner*—Noah P. Kamen
*Assistant Examiner*—Jason A Benton
(74) *Attorney, Agent, or Firm*—Knobbe, Martens, Olson & Bear, LLP

(57) ABSTRACT

A power generator unit incorporates a generator driven by an engine. The engine has a fuel tank. A fuel petcock is connected through fuel hoses between the fuel tank and the engine. An insulating cover surrounds the generator, the engine and the fuel tank. A control panel is positioned on the insulating cover. A fuel control lever is pivotally mounted on the control panel. The fuel control lever is connected to the fuel petcock through a flexible transmitter to open and close the fuel petcock.

22 Claims, 4 Drawing Sheets

FLUID SUPPLY MECHANISM FOR POWER GENERATOR

This application is based on and claims priority under 35 U.S.C. § 119 to Japanese Patent Application No. 2002-088279, filed on Mar. 27, 2002, the entire contents of which are hereby expressly incorporated by reference herein.

BACKGROUND OF THE INVENTION

1. Field of the Invention

The present invention generally relates to a fluid supply mechanism for a power generator. More particularly, the present invention relates to a fluid supply mechanism for a power generator surrounded by an insulating cover.

2. Description of the Related Art

Portable power generators incorporating a generator driven by an internal combustion engine are popular for many uses. Typically, the generator, the engine and other components related to the generator and the engine are surrounded with an insulator cover for suppressing noise.

The engine-driven generators can have a fuel tank for reserving fuel to the engine. A fuel supply mechanism, that includes a fuel pump, couples the fuel tank and the engine. The fuel in the fuel tank is pressurized by the fuel pump and is delivered to the engine through fuel hoses. The fuel, however, needs to be stopped under some circumstances such as, for example, that the power generator is not used for a relatively long period of time or when the power generator is inspected. Thus, the fuel supply mechanism additionally includes a fuel petcock provided between the fuel tank and the fuel pump. The fuel petcock selectively connects the fuel tank to the fuel pump when the fuel petcock is in an open position and disconnects the fuel tank from the fuel tank when the fuel petcock is in a closed position.

Normally, the fuel petcock is disposed in close proximity to a lower portion of the fuel tank so as to reduce a residual amount of the fuel in the hoses. Also, the fuel tank is disposed next to the engine to shorten the hoses and thus is surrounded by the insulating cover, which also surrounds the engine. In some arrangements, the whole body or a portion of the fuel petcock can be disposed out of the insulating cover. In some prior design, a lever portion of the petcock projects from the cover or a relatively long rod extends from the petcock and beyond a surface of the cover so as to be operated by the operator. Such arrangements, however, need the fuel tank or the hoses to be disposed close to the insulating cover. Also, a space is necessary to allow the lever portion or the rod of the petcock to extend within the insulating cover. The space is likely to be an useless space. The arrangements thus limits the arrangement of components with the power generator.

Other fluids, such as, for example, lubricant can also be supplied to the engine in some arrangements. Accordingly, similar complications can arise in connection with the construction and arrangement of other fluid supply system.

A need therefore exists for a fluid supply mechanism for a power generator that is simple in structure and that does not create useless space around its components.

SUMMARY OF THE INVENTION

In accordance with one aspect of the present invention, a power generator unit comprises an internal combustion engine, a generator driven by the internal combustion engine, a fuel supply system. The fuel supply system includes a fuel tank disposed near the engine and at least one fuel conduit that connects the fuel tank to the engine. The generator unit also includes a fuel flow control device having a fuel petcock that regulates fuel flow through the fuel conduit, a fuel control lever that is disposed remotely relative to the fuel petcock, and a coupling mechanism that connecting the fuel control lever to the fuel petcock. The coupling mechanism is flexible along its length and is capable of transmitting a torque so as to transmit rotational movement of the fuel control lever to open and close the fuel petcock.

Another aspect of the present invention involves a power generator unit that comprises an internal combustion engine, a generator driven by the internal combustion engine, and a fuel supply system. The fuel supply system includes a fuel tank disposed near the engine, at least one fuel conduit, and a fuel pump supplying fuel from the fuel tank to the engine through the fuel conduit. A cover encloses the fuel supply system, the engine, and the generator, and a control panel is located on the cover. The control panel is disposed on one side of the fuel tank and the fuel pump is disposed on an opposite side of the fuel tank. A fuel flow control device includes a fuel petcock, a fuel control lever and a coupling mechanism. The fuel petcock regulates fuel flow through the fuel conduit and is disposed below the fuel pump. The fuel control lever is disposed on the control panel, and the coupling mechanism connects the fuel control lever to the fuel petcock. The coupling mechanism is flexible along its length so as to bend around the fuel tank and is capable of transmitting torque such that rotational movement of the fuel control lever is transmitted to the fuel petcock to open and close the fuel petcock.

BRIEF DESCRIPTION OF THE DRAWINGS

The foregoing and other features, aspects and advantages of the present invention are described in detail below in connection with the accompanying drawings of a preferred embodiment. The drawings comprise four figures in which.

DETAILED DESCRIPTION OF THE PREFERRED EMBODIMENT

Figure 1:
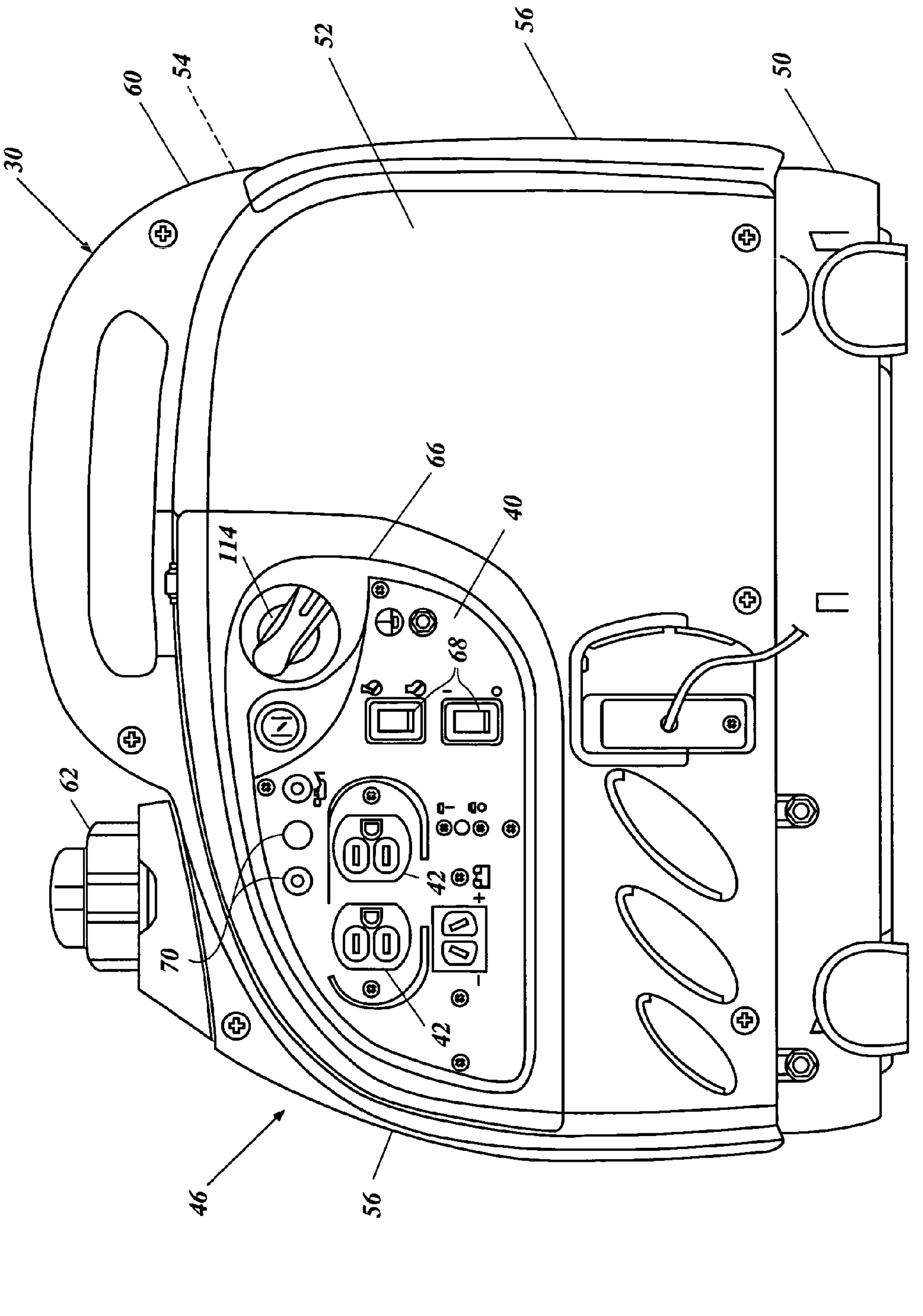
FIG. 1 is a front elevational view of a power generator configured in accordance with a preferred embodiment of the present invention.

Initially, with reference to FIGS. 1–3, an overall structure of a power generator 30 that is configured in accordance with various features, aspects and advantages of the present invention is described below. While the present fluid flow control device is disclosed in the context of regulating fuel flow to an internal combustion engine of a portable power generator, the flow control device can be used to control the flow of other fluids as well as used in connection with a wide variety of other applications.

The power generator 30 preferably comprises a generator 32 (FIG. 1), an internal combustion engine 34, a fuel tank

36, a controller 38 (FIG. 3) and a power output unit 40. The generator 32 preferably generates a raw alternating current (AC) power. The engine 34 drives the generator 32. Any kind of internal combustion engines or other prime mover can be applied. In the illustrated embodiment, the engine 34 is a single cylinder, four-cycle engine; however, the engine can have more cylinders, can operate on other combustion principles, and can have different orientations, configurations and layouts than that shown. The fuel tank 36 reserves fuel that is supplied to the engine 34. The controller 38 preferably controls the generator 32 and converts the row AC power to a higher quality AC power output (e.g., AC power substantially free from voltage and frequency variations and other distortions). Preferably, the controller 38 also controls the speed of the engine 34 such that the generator 32 generates a desired AC power level at least generally to match the power demand load on the power generator unit 30. The power output unit 40 incorporates output terminals 42 and is coupled with the controller 38. The operator can couple connectors of various load devices, such as, for example, a floodlight, an electric saw and the like, with the output terminals 42 to power such devices. In addition, the power generator 30 preferably comprises a cooling fan 44 driven by the engine 34 to cool the generator 32 and the engine 34.

The generator 32, the engine 34 and the fuel tank 36 are closely arranged with each other. In the illustrated arrangement, the generator 32 and the fuel tank 36 together interpose the engine 34 therebetween. The power generator 30 makes a noise. Particularly, the engine 34 can produce a high level of audible sound. In order to prevent the noise from bothering the operator or other persons who are around the power generator 30, the generator 32 and the engine 34 preferably are enclosed in an insulating cover or noise-suppressing housing 46. The fuel tank 36 and other components related to the generator 32 and the engine 34 also are preferably surrounded by the insulating cover 46.

The illustrated insulating cover 46 preferably comprises a single lower cover member 50 and multiple upper cover members which includes a front cover member 52, a rear cover member 54 and side cover members 56. The upper cover members 52, 54, 56 are detachably affixed to the lower cover member 54. The lower cover member 54 generally is configured as a tray-like shape. The engine 34, the fuel tank 36 and the controller 38 are directly fixed to a base portion defined at the bottom of the lower cover member 54 by fasteners such as, for example, bolts and nuts. The engine 34 carries the generator 32 and the cooling fan 44 both previously coupled with the engine 34. The generator 32, the engine 34, the fuel tank 36 and the cooling fan 44 thus are surrounded by the insulating cover 46.

A closed cavity is defined within the insulating cover 46. At least one opening is formed on one of the cover members 52, 54, 56 to draw the ambient air into the cavity for engine operations. An exhaust system also is provided to route exhaust gases from the engine 34 to a location external of the insulating cover 46.

In the illustrated embodiment, the power generator 30 is portable. The cover members 52, 54, 56 can, solely or in combination with other cover members, form a grip 60 with which the operator can carry the power generator 30. The fuel tank 36 has an inlet that extends beyond the insulating cover 46. A cap 62 normally closes the inlet.

An upper portion of the front cover 52 forms a control panel 66, which is located generally in front of the fuel tank 36. In the illustrated arrangement, a relatively large opening is defined in the control panel 66 and the power output unit 40 is exposed through the opening. The power output unit 40 lies generally flush with the surface of the control panel 66. The output terminals 42 are formed at the exposed surface of the control panel 66. Switches 68 and indicators 70 also are located at this surface. The switches 68 and the indicators 70 are connected to the controller 38. The operator thus conveniently operates the controller 38 by turning the switches 68 on or off and monitors the indicators 70 to inspect how the generator 32 and the engine 34 are operating. Alternatively, the control panel in the narrow sense can, of course, have just switches 68 and indicators 70 on its surface. In this description, therefore, the term "control panel" can mean not only the control panel in a narrow sense but also the control panel including the exposed surface of the power output unit 40.

Figure 3:
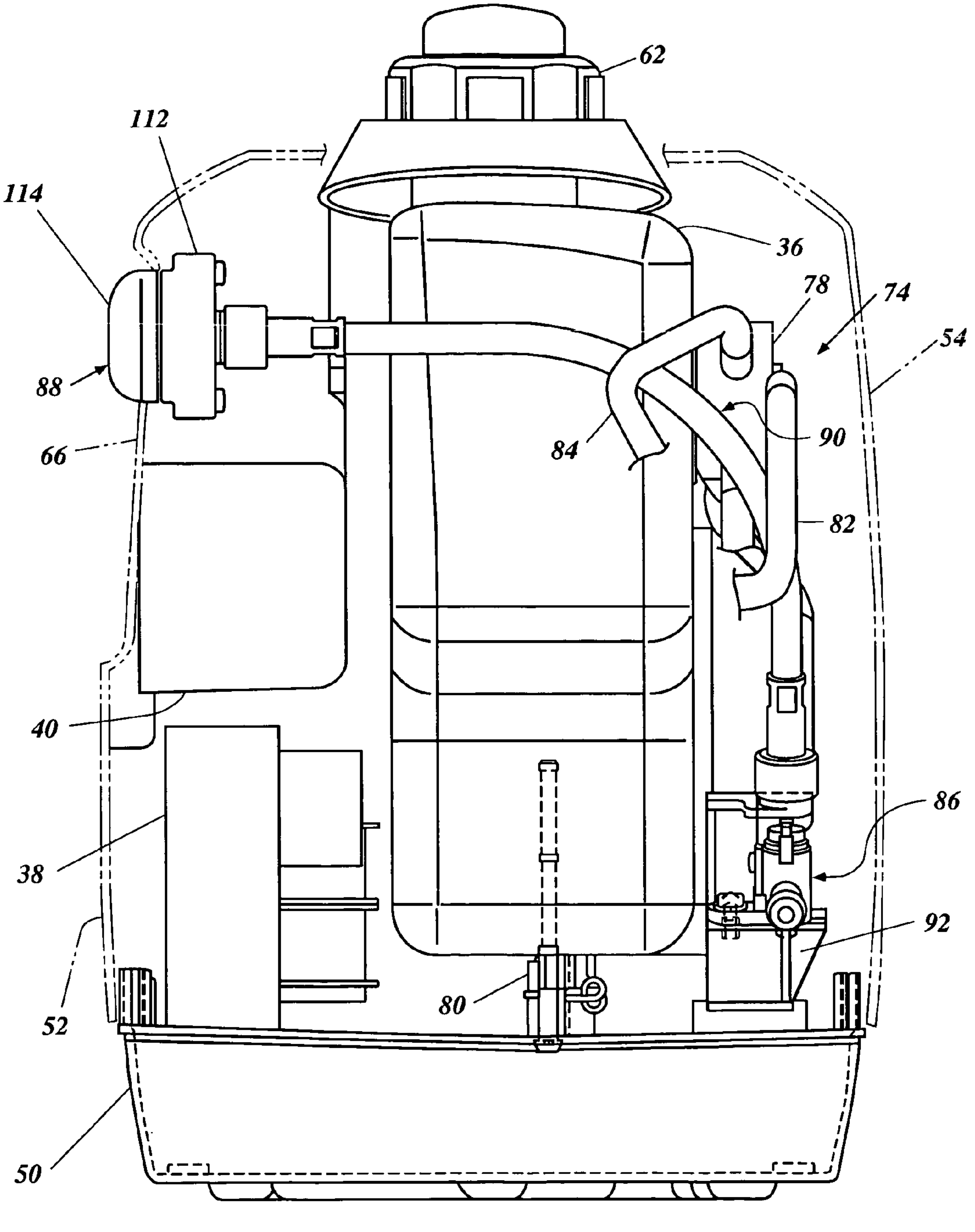
FIG. 3 is a cross-sectional, side elevational view of the power generator, wherein the cross-section is taken generally between a fuel tank and an engine-driven generator thereof, and the insulating cover is illustrated in phantom.

With particular reference to FIG. 3, the controller 38 and the power output unit 40 preferably are positioned next to the fuel tank 36 and on one side of the fuel tank 36 so as to be spaced apart from the generator 32 and the engine 34. This arrangement is advantageous because the heat produced by the generator 32 and the engine 34 is inhibited from transmitting to the controller 38 and the power output unit 40. Also, the controller 38 preferably is nested beneath the power output unit 40 to use the space and, consequently, to make the power generator 30 more compact.

Figure 2:
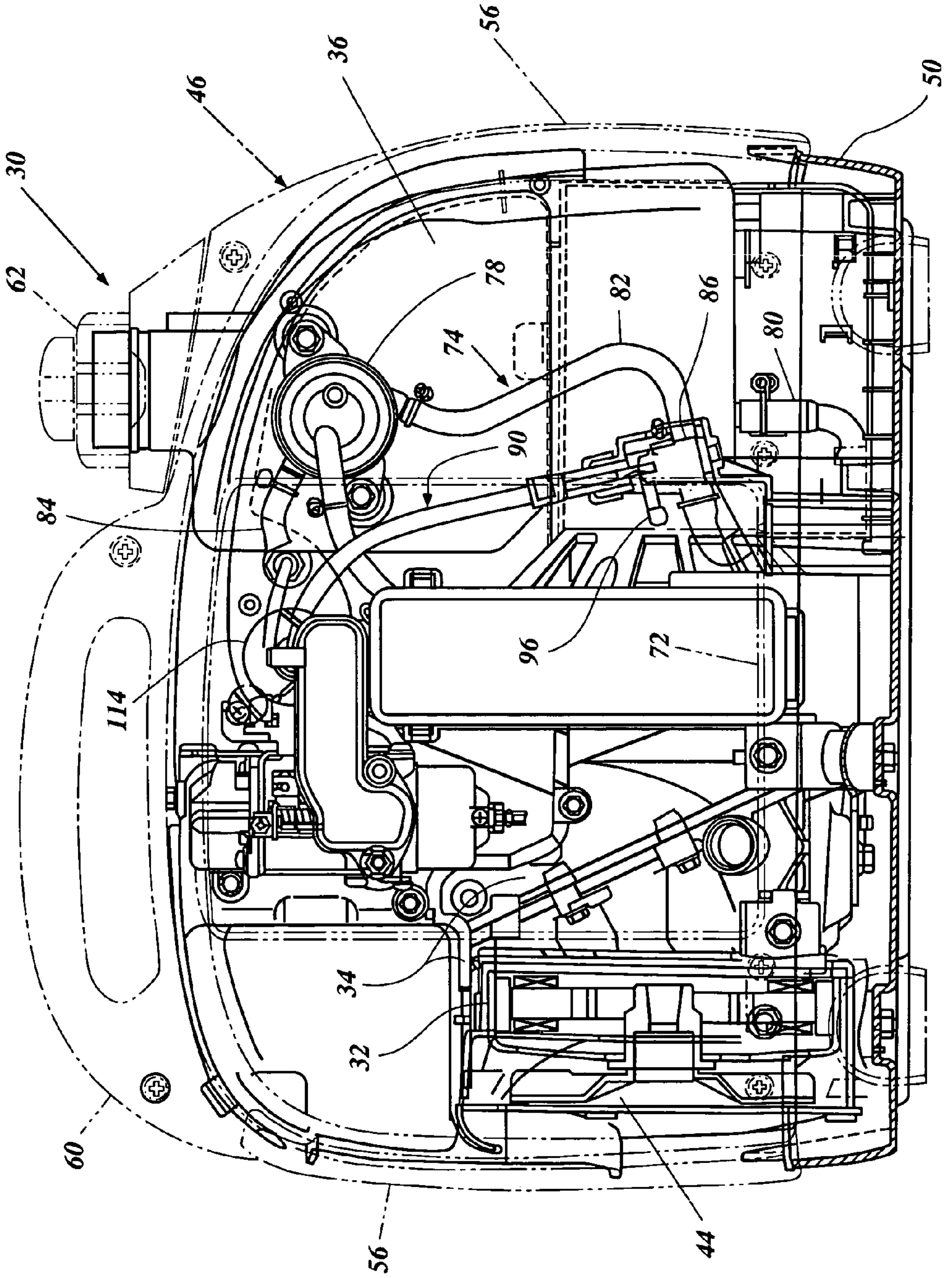
FIG. 2 is a rear view of the power generator of FIG. 1 that is uncovered to show an inside arrangement thereof, wherein an insulating cover and some components attached to the cover are still illustrated in phantom.

With reference to FIG. 2, the rear cover member 54 defines a relatively large opening 72 to allow the operator to access the generator 32, the engine 34, the fuel tank 36 and other components disposed inside of the insulating cover 46. The opening 72 is normally closed by a closure member.

With continued reference to FIGS. 2 and 3, and with additional reference to FIG. 4, a fuel supply mechanism 74 is described below. The fuel supply system 74 comprises a fuel pump 78, fuel hoses 80, 82, 84, and a fuel control device, which includes a fuel petcock 86, a remotely operating unit 88 and a flexible transmitter 90. The fuel pump 78 preferably is mounted on an upper and rear surface of the fuel tank 36 (e.g., generally at the same level as the control panel 66) and is affixed to the rear surface of the fuel tank 36 by fasteners such as, for example, bolts and nuts. The fuel pump 78 can be a diaphragm type and is driven by, for example, the pulsation produced in the engine 34. The fuel petcock 86 is mounted on a bracket 92 that is affixed to a bottom of the fuel tank 36. The operating unit 88, in turn, is mounted on the control panel 66 (in the narrow sense). The flexible transmitter 90 couples the fuel petcock 86 and the operating unit 88.

The fuel hose 80 extends from a bottom of the fuel tank 36 and connects the fuel tank 36 to the petcock 86. The fuel hose 82 extends generally upwardly from the petcock 86 and connects the petcock 86 to the fuel pump 78. The fuel hose 84, in turn, extends generally transversely from the fuel pump 78 and connects the fuel pump 78 to a portion of the engine 34, which preferably is a carburetor or another equivalent device (e.g., fuel injector) of the engine 34.

Figure 4:
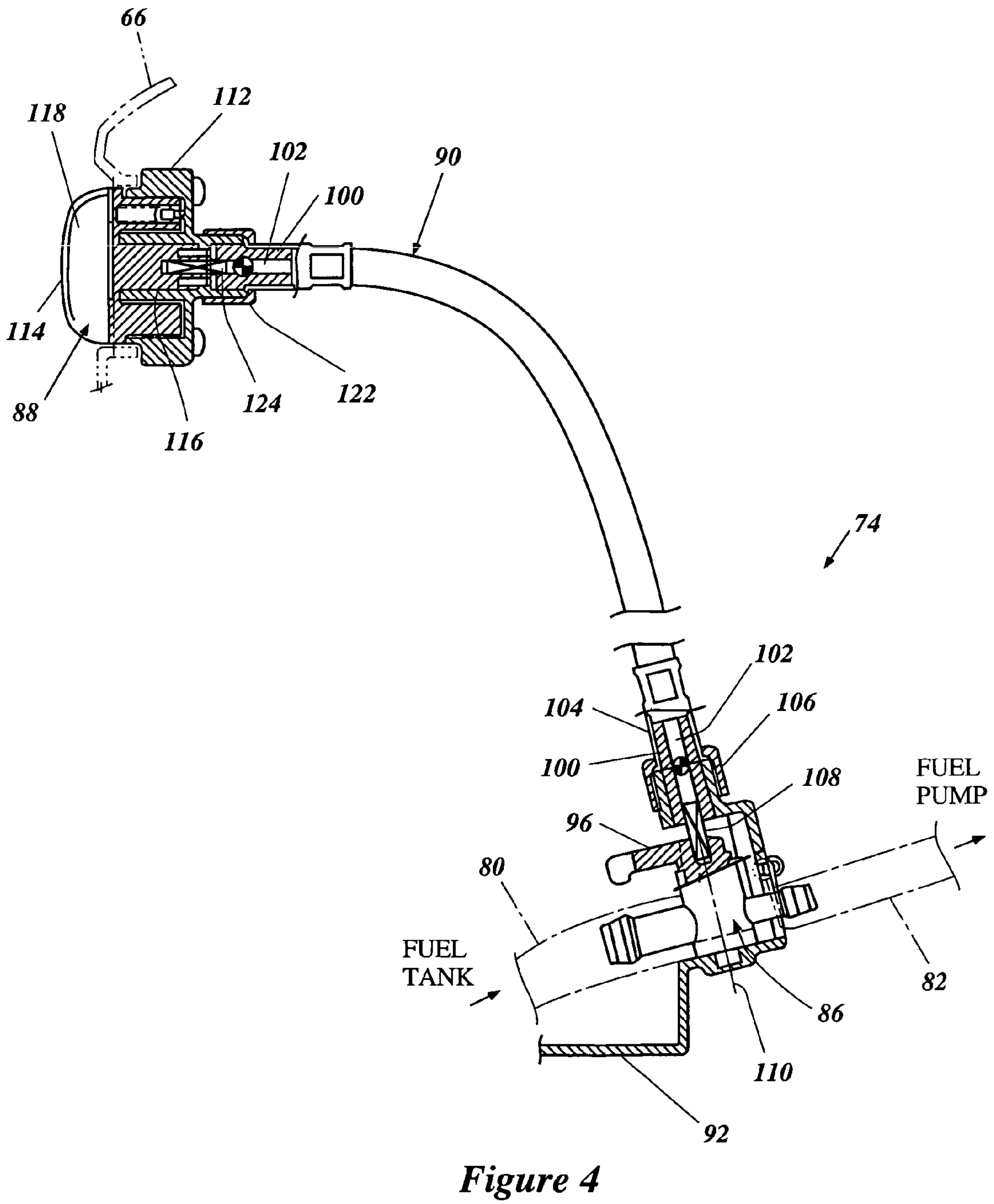
FIG. 4 is a side elevational view of a fuel supply mechanism of the power generator, wherein portions of the fuel supply mechanism are illustrated in cross-section.

With particular reference to FIG. 4, a body of the petcock 86 is affixed to the bracket 92. A petcock lever 96 is pivotally disposed in the body of the petcock 86 and can take an open position in which the petcock 86 is opened and a closed position in which the petcock 86 is closed. When the fuel hoses 80, 82 connected (i.e., when the fuel petcock is open), the fuel in the fuel tank 36 can drawn by the fuel pump 36. However, the fuel hoses 80, 82 are disconnected and the fuel in the fuel tank 36 cannot be drawn by the fuel pump 36 when the petcock 86 is closed.

The petcock lever 96 can be directly operated with the closure member removed from the opening 72 defined at the rear cover member 54. The illustrated petcock lever 96, however, is remotely operable by the operating unit 88 through the flexible transmitter 90.

As best seen in FIG. 4, the flexible transmitter 90 preferably comprises a flexible tubular member 100, a flexible wire 102 and a plastic cover member 104. One end of the tubular member 100 is affixed to the bracket 92 by a socket 106. The wire 102 extends through the tubular member 100. The cover member 104 covers an outer surface of the tubular member 100. The wire 102 preferably has proper rigidity as well as flexibility. Thus, the wire preferably is made of metal material, and can be solid or formed by strands (e.g., meshed strands). For example, a steel wire is applicable. Any other flexible members that have the flexibility and the rigidity can replace the wire. The tubular member 100 can be made of plastic or metal material. The tubular member 100 and the cover member 104 are not necessarily provided. That is, at least a wire or something equivalent is only required to comprise the flexible transmitter 90.

The wire 102 has an end portion 108 that is configured as a rectangular parallelepiped shape. The end portion 108 is fitted into a recess formed at the petcock lever 96. The recess has generally the same shape as the end portion 108. Thus, the petcock lever 96 can pivot about an axis 110 of the petcock lever 96 while the wire 108 pivoting. The petcock lever 96 preferably is held at the opening and closing positions by, for example, a detent mechanism.

The flexible transmitter 90 extends to the operating unit 88. The operating unit 88 preferably comprises a base 112 and a fuel control lever 114. The base 112 is affixed to the control panel 66 by fasteners such as, for example, bolts and nuts. Alternatively, the base 112 can be affixed to the power output unit 40 directly or with a bracket. The fuel control lever 114 has a root section 116 and a knob section 118. The root section 116 is pivotally supported by the base 112. The control panel 66 defines a relatively small opening. The knob section 118 extends outwardly beyond this opening so as to be exposed such that the operator can grasp the knob section 118.

An opposite end of the tubular member 100, which is located at the operating unit 88, is affixed to the base 112 by a socket 122. Similarly, an opposite end portion 124 of the wire 102, which also is located at the operating unit 88, has a rectangular parallelepiped shape. The end portion 124 is fitted into a recess formed at the root section 116 of the fuel control lever 114. The recess has generally the same shape as the end portion 124. Thus, the wire 108 can pivot with the knob section 116 when the fuel control lever 114 is operated to pivot. The fuel control lever 114 preferably is held at both of fully pivoted positions by, for example, a detent mechanism.

As thus constructed, the petcock 86 can be remotely operated to pivot between the open and closed positions through the flexible transmitter 90 when the knob 114 of the operating unit 88 is operated by the operator. The flexible transmitter 90 is quite advantageous to connect the petcock 86 and the operating unit 88 because the fuel tank 36 prevents the petcock 86 and the operating unit 88 from being connected straight with each other in this arrangement. Thus, as best seen in FIG. 2, the flexible transmitter 90 bends around the fuel tank 36 when connecting the fuel control lever 114 to the fuel petcock 86.

The illustrated wire 102 can be twisted between its fixed ends due to its length (i.e., because the petcock 86 and the operating unit 88 are disposed relatively far apart). The twist of the wire 102 can allow for an angular range of the pivotal movement of the petcock lever 96 be smaller than an angular range of the pivotal movement of the fuel control lever 114. In other words, in some applications, the fuel control lever 114 needs to pivot through an angular range greater than an angular range through which the petcock lever 96 pivots. In this arrangement, the pivotal angular range of the fuel control lever 114 is set so as to be greater than the pivotal angular range of the petcock lever 96. Accordingly, the petcock lever 96 can fully pivot between the open position and the closed position of the petcock 86. The flexible transmitter thus acts as a lost motion mechanism to permit the fuel control lever 114 to pivot through a greater range of movement than the fuel petcock 86.

The fuel control lever 114 in this arrangement is neatly exposed at the control panel 66. The operator thus can easily locate the fuel control lever 114. The flexible transmitter 90 contributes to position the fuel control lever 114 at the control panel 66 because the flexible transmitter 90 can snake its way to the fuel control lever 114 even though a number of electrical members or harnesses are disposed around the control panel 66 or the power output unit 40. In addition, the flexible transmitter 90 can position the fuel control lever 114 at the control panel 66 even though the petcock 86 is positioned on a side the fuel tank 36 that is opposite to the control panel 66 and is positioned lower than the control panel 66.

As thus described, any members, components and devices disposed around the generator 32, the engine 34 and the fuel tank 36 within the insulating cover 46 can be placed at the most suitable positions of their own and do not require any special arrangements to account for the relative locations of the fuel petcock 86 and the fuel control lever 114. That is, the power generator can be designed more compactly and can be manufactured at a lower cost.

Although the present invention has been described in terms of a certain preferred embodiment, other embodiments apparent to those of ordinary skill in the art also are within the scope of this invention. Thus, various changes and modifications may be made without departing from the spirit and scope of the invention. For instance, the petcock can be another type of valve such as, for example, an axially movable valve. In this alternative, the wire or something equivalent preferably moves reciprocally with the fuel control lever pivoting or moving axially. Also, the operating unit (fuel control lever) can be placed at any portions other than the control panel such as, for example, the rear cover member. In addition, the features, aspects and advantages of the present invention can be applied to any fluid supply mechanisms such as, for example, a lubricant supply mechanism. Accordingly, the scope of the present invention is intended to be defined only by the claims that follow.

What is claimed is:

1. A power generator unit comprising an internal combustion engine, a generator driven by the internal combustion engine, a fuel supply system including a fuel tank disposed near the engine and at least one fuel conduit connecting the fuel tank to the engine, and a fuel flow control device including a fuel petcock regulating fuel flow through the fuel conduit, a fuel control lever disposed remotely relative to the fuel petcock, and a coupling mechanism connecting the fuel control lever to the fuel petcock, the coupling mechanism being flexible along its length and having a flexible wire that pivots around a central axis of the flexible wire when the fuel control lever is actuated, the coupling mechanism transmitting a torque so as to transmit rotational movement of the fuel control lever to open and close the fuel petcock.

2. The power generator unit of claim 1 additionally comprising a cover surrounding at least a portion of at least one of the generator and the engine.

3. The generator unit of claim 2, wherein the cover encloses at least the engine, the generator and the fuel tank.

4. The power generator unit of claim 2, wherein the cover includes at least one sound insulating section.

5. The power generator unit of claim 1 additionally comprising a control panel that is electrically coupled to at least one of the engine and the generator, and the fuel control lever being disposed on the control panel.

6. The power generator unit of claim 5, wherein the fuel supply system includes a fuel pump, the fuel pump is disposed on one side of the fuel tank and the control panel is disposed on an opposite side of the fuel tank, and the fuel petcock is disposed below the fuel pump.

7. The power generator unit of claim 6, wherein the fuel pump includes a diaphragm.

8. The power generator unit of claim 6, wherein the fuel pump is disposed at a point that is as high as the control panel.

9. The power generator unit of claim 1, wherein the fuel control lever has a predetermined range of rotation, and an actuator of the fuel petcock has a predetermined range of rotation that is less than the predetermined range of rotation of the fuel control lever.

10. The power generator unit of claim 1, wherein the fuel supply system includes a fuel pump, and the fuel petcock is disposed downstream of the fuel pump.

11. The power generator unit of claim 1, wherein the coupling mechanism comprises a flexible, steel cable.

12. The power generator unit of claim 11, wherein the coupling mechanism also includes a shroud that surrounds at least a portion of the flexible steel cable, and the flexible cable being able move relative to the shroud.

13. The power generator unit of claim 12, wherein the fuel petcock includes a protruding actuator, and the coupling mechanism includes a flexible connecting member that is interacts with the protruding actuator.

14. A power generator unit comprising an internal combustion engine, a generator driven by the internal combustion engine, a fuel supply system including a fuel tank disposed near the engine, at least one fuel conduit, and a fuel pump supplying fuel from the fuel tank to the engine through the fuel conduit, a cover enclosing the fuel supply system, the engine, and the generator, a control panel on the cover, the control panel being disposed on one side of the fuel tank and the fuel pump being disposed on an opposite side of the fuel tank, and a fuel flow control device including a fuel petcock regulating fuel flow through the fuel conduit and being disposed below the fuel pump, a fuel control lever disposed on the control panel, and a coupling mechanism connecting the fuel control lever to the fuel petcock, the coupling mechanism being flexible along its length so as to bend around the fuel tank and transmitting a torque so as to transmit rotational movement of the fuel control lever to open and close the fuel petcock.

15. The power generator unit of claim 14, wherein the coupling mechanism comprises a flexible, steel cable.

16. The power generator unit of claim 15, wherein a shroud surrounds at least a portion of the flexible steel cable, and the flexible cable being able move relative to the shroud.

17. The power generator unit of claim 16, wherein the fuel petcock includes a protruding actuator, and the coupling mechanism includes a flexible connecting member that is interacts with the protruding actuator.

18. The power generator unit of claim 14, wherein the fuel pump is disposed at a point that is as high as the control panel.

19. The power generator unit of claim 14, wherein the fuel control lever has a predetermined range of rotation, and an actuator of the fuel petcock has a predetermined range of rotation that is less than the predetermined range of rotation of the fuel control lever.

20. The power generator unit of claim 14, wherein the cover includes at least one sound insulating section.

21. A power generator unit comprising an internal combustion engine, a generator driven by the internal combustion engine, a fuel supply system including a fuel tank disposed near the engine and at least one fuel conduit connecting the fuel tank to the engine, a fuel flow control device including a fuel petcock regulating fuel flow through the fuel conduit, a fuel control lever disposed remotely relative to the fuel petcock, and a coupling mechanism connecting the fuel control lever to the fuel petcock, at least a portion of the engine being located between the fuel control lever and the fuel petcock, the coupling mechanism being flexible along its length so as to extend around the portion of the engine and transmitting a torque so as to transmit rotational movement of the fuel control lever to open and close the fuel petcock.

22. The power generator unit of claim 21, wherein the coupling mechanism is non-linear.

* * * * *